(12) United States Patent
Heller et al.

(10) Patent No.: US 12,397,741 B2
(45) Date of Patent: Aug. 26, 2025

(54) SYSTEM AND METHOD FOR HAZARDOUS DRIVING PREVENTION

(71) Applicant: DYM SENSE LTD, Rishon LeTsiyon (IL)

(72) Inventors: Dor Heller, Tel Aviv (IL); Eyal Meron, Rosh Ha'Ayin (IL)

(73) Assignee: DYM SENSE LTD, Rishon Letsiyon (IL)

(*) Notice: Subject to any disclaimer, the term of this patent is extended or adjusted under 35 U.S.C. 154(b) by 29 days.

(21) Appl. No.: 18/346,521

(22) Filed: Jul. 3, 2023

(65) Prior Publication Data

US 2023/0339428 A1 Oct. 26, 2023

Related U.S. Application Data

(63) Continuation-in-part of application No. 17/258,457, filed as application No. PCT/IL2019/050752 on Jul. 7, 2019, now Pat. No. 11,724,702.

(60) Provisional application No. 62/695,049, filed on Jul. 8, 2018.

(51) Int. Cl.
| | |
|---|---|
| *B60R 25/00* | (2013.01) |
| *B60R 25/102* | (2013.01) |
| *B60R 25/25* | (2013.01) |
| *G07C 9/00* | (2020.01) |
| *B60R 25/10* | (2013.01) |

(52) U.S. Cl.
CPC .......... *B60R 25/003* (2013.01); *B60R 25/102* (2013.01); *B60R 25/252* (2013.01); *B60R 25/257* (2013.01); *G07C 9/00904* (2013.01); *B60R 2025/1013* (2013.01)

(58) Field of Classification Search
CPC ... B60R 25/003; B60R 25/102; B60R 25/252; B60R 25/257; B60R 2025/1013; G07C 9/00904
USPC ....................................................... 340/439
See application file for complete search history.

(56) References Cited

U.S. PATENT DOCUMENTS

| | | |
|---|---|---|
| 4,738,333 A | 4/1988 | Collier |
| 4,996,161 A | 2/1991 | Conners |
| 5,348,003 A | 9/1994 | Caro |

(Continued)

FOREIGN PATENT DOCUMENTS

| | | |
|---|---|---|
| CN | 203142402 | 8/2013 |
| CN | 107031653 | 3/2018 |

*Primary Examiner* — Naomi J Small
(74) *Attorney, Agent, or Firm* — PEARL COHEN ZEDEK LATZER BARATZ LLP

(57) ABSTRACT

A system for preventing an unauthorized and/or hazardous use of a vehicle. The system may include a first sensor; a driver recognition module in communication with the first sensor, the driver recognition module is configured to determine an identity of a driver based on readings of the first sensor; a second sensor; a driver condition determination module in communication with the second sensor, the driver condition determination module is configured to determine a condition of the driver based on readings of the second sensor; and a hazardous driving prevention module in communication with the driver recognition module and driver condition determination, the hazardous driving prevention module is configured to determine and perform one or more actions of a predetermined set of actions based on the determined identity and determined condition of the driver.

20 Claims, 9 Drawing Sheets

(56) References Cited

U.S. PATENT DOCUMENTS

| | | | |
|---|---|---|---|
| 5,743,349 A | 4/1998 | Steinberg | |
| 5,823,951 A | 10/1998 | Messerschmidt | |
| 6,157,317 A | 12/2000 | Walker | |
| 6,229,908 B1 | 5/2001 | Edmonds, III | |
| 6,504,614 B1 | 1/2003 | Messerchmidet et al. | |
| 6,654,125 B2 | 11/2003 | Maynard et al. | |
| 6,885,439 B2 | 4/2005 | Fujieda | |
| 6,967,581 B2 | 11/2005 | Karsten | |
| 7,016,713 B2 | 3/2006 | Gardner et al. | |
| 7,403,804 B2 | 7/2008 | Ridder et al. | |
| 7,451,852 B2 | 11/2008 | Stewart et al. | |
| 8,095,193 B2 | 1/2012 | Ridder | |
| 8,297,399 B2 | 10/2012 | Goi | |
| 8,469,134 B2 | 6/2013 | Osaki | |
| 8,515,506 B2 | 8/2013 | Ridder et al. | |
| 8,581,711 B2 | 11/2013 | Al-Ali | |
| 8,781,544 B2 | 7/2014 | Al-Ali et al. | |
| 9,475,387 B2 | 10/2016 | Wu | |
| 10,034,635 B2 | 7/2018 | Nothacker | |
| 10,045,096 B2 | 8/2018 | Briggs | |
| 10,099,554 B2 | 10/2018 | Steeg et al. | |
| 10,302,628 B2 | 5/2019 | Nothacker et al. | |
| 2004/0239510 A1 | 12/2004 | Karsten | |
| 2006/0212195 A1 | 9/2006 | Veith et al. | |
| 2007/0144812 A1* | 6/2007 | Stewart | B60K 28/063 |
| | | | 307/10.6 |
| 2008/0191009 A1* | 8/2008 | Gressel | H04W 4/021 |
| | | | 235/382 |
| 2009/0043409 A1* | 2/2009 | Ota | B60K 28/063 |
| | | | 340/576 |
| 2009/0092296 A1 | 4/2009 | Yokoyama | |
| 2010/0108425 A1 | 5/2010 | Crespo | |
| 2012/0055726 A1* | 3/2012 | Hannon | H04K 3/415 |
| | | | 180/272 |
| 2012/0075094 A1 | 3/2012 | Keays | |
| 2012/0242469 A1 | 9/2012 | Morgan | |
| 2013/0169442 A1 | 7/2013 | Ruocco | |
| 2013/0238167 A1* | 9/2013 | Stanfield | G08G 1/20 |
| | | | 701/2 |
| 2014/0359722 A1* | 12/2014 | Schultz | H04L 63/0861 |
| | | | 726/5 |
| 2016/0001781 A1* | 1/2016 | Fung | G07C 9/37 |
| | | | 701/36 |
| 2016/0171546 A1 | 6/2016 | Gartenberg | |
| 2017/0096145 A1 | 4/2017 | Bahn | |
| 2017/0263120 A1* | 9/2017 | Durie, Jr. | G08G 1/205 |
| 2018/0116604 A1* | 5/2018 | Newberry | A61B 5/4845 |
| 2018/0247070 A1* | 8/2018 | Evans | G08B 25/12 |
| 2018/0349628 A1* | 12/2018 | Bender | G06F 21/6218 |
| 2018/0364649 A1* | 12/2018 | Kim | G04G 9/00 |
| 2019/0180216 A1* | 6/2019 | Buraparate | G06Q 10/063112 |
| 2019/0370442 A1* | 12/2019 | Novelli | G06V 40/1306 |
| 2021/0259557 A1 | 8/2021 | Frank | |
| 2021/0269044 A1 | 9/2021 | Zarbel | |

* cited by examiner

700

```
┌─────────────────────────────────────┐
│ DETERMINING, BY A USER              │
│ RECOGNITION MODULE, AN IDENTITY     │
│ OF A USER BASED ON ONE OR MORE      │─── 710
│ READINGS OF A FIRST SENSOR          │
└─────────────────────────────────────┘
                  │
┌─────────────────────────────────────┐
│ DETERMINING, BY A CONDITION         │
│ DETERMINATION MODULE, A             │
│ CONDITION OF THE USER BASED ON      │─── 720
│ ONE OR MORE READINGS OF A SECOND    │
│ SENSOR                              │
└─────────────────────────────────────┘
                  │
┌─────────────────────────────────────┐
│ GRANTING, LIMITING, OR PREVENTING   │
│ ACCESS OF THE USER, BY AN ACCESS    │
│ MODULE TO AT LEAST ONE OF: AN       │
│ APPARATUS OR A BUILDING BASED ON    │
│ AT LEAST ONE OF: THE DETERMINED     │─── 730
│ IDENTITY OF THE USER; THE           │
│ DETERMINED CONDITION OF THE USER;   │
│ AND A PREDETERMINED SET OF RULES.   │
└─────────────────────────────────────┘
```

FIG. 7

SYSTEM AND METHOD FOR HAZARDOUS DRIVING PREVENTION

CROSS-REFERENCE TO RELATED APPLICATIONS

This application is a continuation-in-part of U.S. patent application Ser. No. 17/258,457, filed Jan. 7, 2021 which is itself a National Phase Application of PCT International Patent Application No. PCT/IL2019/050752, International Filing Date Jul. 7, 2019, entitled System and Method for Hazardous Driving Prevention, published on Jan. 16, 2020 as PCT International Patent Application Publication No. WO 2020/012461, claiming the benefit of U.S. Provisional Patent Application No. 62/695,049, filed Jul. 8, 2018, all of which are hereby incorporated by reference.

FIELD OF THE INVENTION

The present invention relates to the field of safe driving systems, and more particularly, to systems for preventing an unfit driver from driving a vehicle.

BACKGROUND OF THE INVENTION

Current safe driving systems are typically limited to account for no more than a few parameters of a driver when considering whether the driver is in a condition to use a vehicle. There is a long felt need for a system that uses multiple factors to deter driving by an unfit driver.

SUMMARY OF THE INVENTION

One aspect of the present invention provides a system for preventing an unauthorized and/or hazardous use of a vehicle, the system may include: a first sensor; a driver recognition module in communication with the first sensor, the driver recognition module is configured to determine an identity of a driver based on readings of the first sensor; a second sensor; a driver condition determination module in communication with the second sensor, the driver condition determination module is configured to determine a condition of the driver based on readings of the second sensor; and a hazardous driving prevention module in communication with the driver recognition module and driver condition determination, the hazardous driving prevention module is configured to determine and perform one or more actions of a predetermined set of actions based on the determined identity of the driver, the determined condition of the driver and a predetermined set of rules; wherein the predetermined set of actions includes at least one of: allowing the driver to use the vehicle, allowing the driver to use the vehicle under certain restrictions, and warning at least one of the driver, passengers and a third party concerning the determined condition of the driver.

In some embodiments, the first sensor is selected from a group consisting of: fingerprint recognition sensor, face recognition sensor and voice recognition sensor.

In some embodiments, the second sensor is selected from a group consisting of: sensor for measuring levels of legal drugs, sensor for measuring levels of illegal drugs, and sensors for measuring levels of hormones.

In some embodiments, the first sensor and the second sensor are operationally linked such that the identity of the driver is determined together with the condition of the driver to make sure that the identity and the condition are being determined for the same driver.

In some embodiments, the hazardous driving prevention module is configured to: classify the driver based on the determined identity of the driver to yield a classification of the driver; and determine and perform the one or more actions based on the determined condition of the driver and further based on the classification of the driver.

In some embodiments, the hazardous driving prevention module is configured to reidentify the driver to ensure that the driver who is driving a vehicle is the driver that is allowed to drive.

In some embodiments, the system includes a self-testing module in communication with the driver condition determination module and the hazardous driving prevention module, the self-testing module is configured to enable the driver to perform a self-test using the driver condition determination module and the hazardous driving prevention module without saving a self-test result in a log of the system.

Another aspect of the present invention may provide a method of preventing an unauthorized and/or hazardous use of a vehicle, the method may include: determining an identity of a driver based on readings of a first sensor; determining a condition of the driver based on readings of a second sensor; and determining and performing one or more actions of a predetermined set of actions based on the determined identity of the driver, the determined condition of the driver and a predetermined set of rules, wherein the predetermined set of actions includes at least one of: allowing the driver to use the vehicle, allowing the driver to use the vehicle under certain restrictions, and warning at least one of the driver, passengers and a third party concerning the determined condition of the driver.

In some embodiments, the method may further include: classifying the driver based on the determined identity of the driver to yield a classification of the driver; and determining and perform the one or more actions based on the determined condition of the driver and further based on the classification of the driver.

In some embodiments, the method may further include reidentifying the driver to ensure that the driver who is driving a vehicle is the driver that is allowed to drive.

In some embodiments, the method may further include enabling the driver to perform a self-test without saving a self-test result in a log of the system.

According to one or more embodiments there is also provided a system for limiting or preventing access, the system including: a first sensor; a user recognition module in communication with the first sensor and configured to determine an identity of a user based on one or more readings of the first sensor; a second sensor; a condition determination module in communication with the second sensor and configured to determine a condition of the user based on one or more readings of the second sensor; and an access module in communication with the user recognition module and the condition determination module, the access module configured to grant, limit, or prevent access of the user to at least one of: an apparatus or a building, the access module configured to grant, limit or prevent access based on at least one of: the determined identity of the user; the determined condition of the user; and a predetermined set of rules.

According to some embodiments, the second sensor and the condition determination module are included in a wearable element.

According to some embodiments, the wearable element further includes the first sensor and the user recognition module.

According to some embodiments, the first sensor is a sensor configured for at least one of: facial recognition, voice recognition, or fingerprint recognition.

According to some embodiments, the one or more readings of the second sensor include one or more spectral measurements at one or more specified wavelengths.

According to some embodiments, the condition determination module is configured to determine at least one of: a hormone level; an alcohol level; a legal drug level; or an illegal drug level of the user based on the one or more spectral measurements.

According to some embodiments, the apparatus is at least one of: a vehicle, heavy machinery, a medical device, and/or a power tool.

According to some embodiments, the access module is in communication with a start button of the apparatus and is configured to prevent access to the apparatus by disabling operation of the start button.

According to some embodiments, the access module is in communication with one or more operational systems of the apparatus and is configured to limit access to the apparatus by limiting a maximum extent of one or more operational modes of the apparatus, or restricting operation to only a predefined set of the one or more operational modes of the apparatus.

According to some embodiments, the building is one of: a factory, a school, a stadium, an airport, and/or an operating theatre.

According to some embodiments, the access module is in communication with a controllable access point of the building and is configured to prevent access to the building by disabling opening of the access point for the user.

According to some embodiments, the system is configured to alert a third party as to the determined condition of the user.

According to one or more embodiments, a method for limiting or preventing access, includes the steps of: determining, by a user recognition module, an identity of a user based on one or more readings of a first sensor; determining, by a condition determination module, a condition of the user based on one or more readings of a second sensor; and granting, limiting, or preventing access of the user, by an access module to at least one of: an apparatus or a building based on at least one of: the determined identity of the user; the determined condition of the user; and a predetermined set of rules.

According to some embodiments, the one or more readings of the second sensor include one or more spectral measurements at one or more specified wavelengths.

According to some embodiments, determining a condition of the user based on one or more readings of a second sensor comprises determining at least one of: a hormone level; an alcohol level; a legal drug level; or an illegal drug level of the user based on the one or more spectral measurements.

According to some embodiments, the apparatus is at least one of: a vehicle, heavy machinery, a medical device, and/or a power tool.

Some embodiments include preventing access to the apparatus by disabling operation of a start button.

Some embodiments include limiting a maximum extent of one or more operational modes of the apparatus, or restricting operation to only a predefined set of the one or more operational modes of the apparatus.

Some embodiments include preventing access to the building by disabling opening of a controllable access point for the user.

Some embodiments include alerting a third party as to the determined condition of the user.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings:

FIG. 7 is a flowchart of a method for limiting or preventing access according to some embodiments of the invention.

Figure 1:
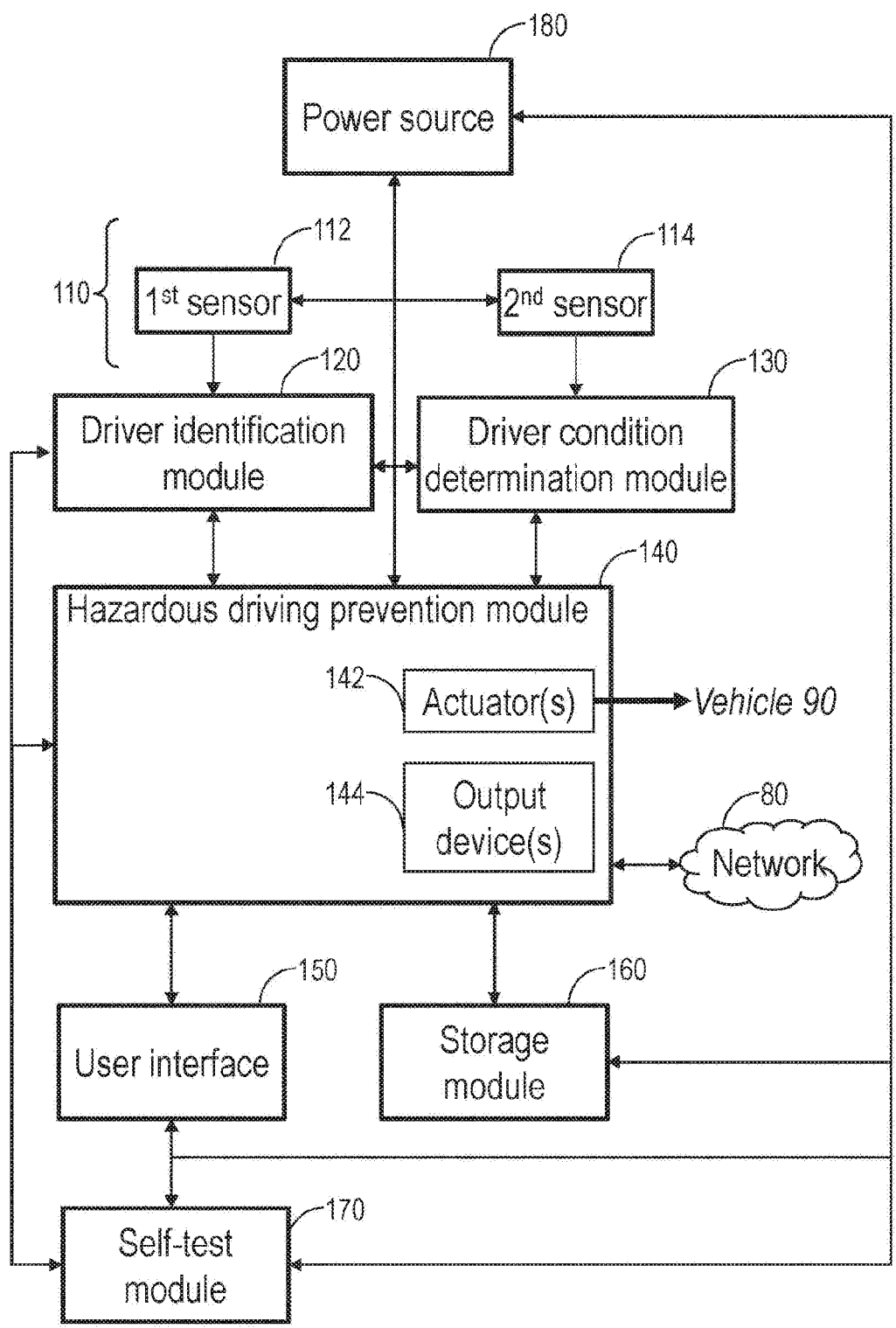
FIG. 1 is a schematic block diagram of a system for preventing an unauthorized and/or hazardous use of a vehicle, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Some aspects of the present invention may provide a system for preventing an unauthorized and/or hazardous use of a vehicle. In some embodiments, the system may use sensors and/or other information sources to identify the driver and/or to determine a condition of the driver before a vehicle is operated. In some embodiments, the system may allow for multiple levels and/or forms of control of driver behavior. For example, the system may discourage and/or prevent operation of the vehicle according to a level of hazard. In some embodiments, the system may account for possible errors in measurements, personal factors of the driver, external conditions (e.g., time, weather, and/or location), etc. For example, under some conditions the system may take action to prevent use of the vehicle. In some embodiments, the system may alert a third party of the driver's situation. In some embodiments, the system may alert the driver and/or passengers of the conditions and/or offer options and/or suggestions.

In various embodiments, the system may identify a vehicle driver before operation of the vehicle, during operation of the vehicle and/or after operation of the vehicle. For example, the system may prevent an authorized driver from initiating a trip and then passing the vehicle to an unauthorized driver. For example, the system may prevent parking and/or switching off a vehicle by a driver who was not approved at the beginning of a trip.

In some embodiments, the system may allow a personalized control and/or oversight of the users of a vehicle. For example, the system may include many customizable options regarding the condition of a driver, identities of a driver and/or consequences of actions of a driver of a vehicle. The system may allow personalized control of access of drivers to a vehicle accounting for, for example, the identity of the driver, the condition of the driver, external conditions etc. For example, the system may facilitate control of the use of a vehicle by a legal authority, a guardian of a driver and/or a vehicle owner.

Reference is now made to FIG. 1, which is a schematic block diagram of a system 100 for preventing an unauthorized and/or hazardous use of a vehicle, according to some embodiments of the invention.

According to some embodiments, system 100 may include one or more sensor(s) 110, a driver identification module 120, a driver condition determination module 130, a hazardous driving prevention module 140, a user interface 150, a storage module 160 and a power source 180.

According to some embodiments, sensor(s) 110 may be in communication with driver identification module 120 and driver condition determination module 130.

Driver identification module 120 may receive readings of sensor(s) 110 and determine an identity of a potential driver of a vehicle based on the readings thereof. Driver condition determination module 130 may receive readings of sensor(s) 110 and determine a condition of the potential driver based on the readings thereof.

In some embodiments, system 100 may include different sensor(s) for identifying the driver and different sensor(s) for determining the condition of the driver. For example, system 100 may include one or more first sensors 112 for identifying the driver and one or more sensors 114 for determining the condition of the driver. First sensor(s) 112 may, for example, be sensor(s) for fingerprint recognition, face recognition, voice recognition, etc. Second sensor(s) 114 may, for example, be sensor(s) for measuring levels of legal drugs (e.g., alcohol and/or prescription drugs and/or pain killers) and/or illegal drugs (e.g., cannabis and/or cocaine), levels of hormones (e.g., signs that a driver is angry or tired) and/or other signs that a person is not fit to drive.

First sensor(s) 112 may be in communication with driver identification module 120 and second sensor(s) 114 may be in communication with driver condition determination module 130. The communication between sensor(s) 110 and identification module 120 and driver condition determination module 130 may be wired or wireless. For example, first sensor(s) 112 used to identify the driver may be required to connect to driver identification module 120 by a local connection and/or a hardwired connection (so that it is clear that the driver who is identifying himself is actually present). In another example, first sensor(s) used to identify the driver may be connected to a device that is required to operate the vehicle (e.g., a key, ignition switch/button, steering wheel, gear stick, etc.). The selection of the device may be according to user's preferences.

In some embodiments, first sensor(s) 112 and second sensor(s) 114 may be operationally linked. For example, a fingerprint sensor used for identifying the driver (e.g., first sensor 112) may be connected to a blood alcohol sensor (e.g., second sensor 114) used for determining driver's blood alcohol concentration (e.g., the driver condition). In this manner, the identity of the driver may be determined together with the condition of the driver to make sure that the approved driver is the one who, for example, tested negative to blood alcohol and/or drug content.

In various embodiments, first sensor(s) 112 and/or second sensor(s) 114 are non-invasive sensors. In various embodiments, first sensor(s) 112 and/or second sensor(s) 114 are not breathalyzers (e.g., are not sensors configured to analyze a breath sample).

Hazardous driving prevention module 140 may be in communication with driver identification module 120 and driver condition determination module 130. Hazardous driving prevention module 140 may determine and perform one or more actions of a plurality of actions based on the determined identity of the protentional driver, determined condition of the protentional driver and a predetermined set of rules. For example, a rule may state that, for an unauthorized driver and/or a driver where there is reliable data that the driver is significantly debilitated, hazardous driving prevention module 140 may activate a locking device to prevent access to the vehicle. For example, for a less clear case, hazardous driving prevention module 130 may send a message informing a third party of the situation (for example the message may be sent over a network). For another case, for example where the driver is authorized but may be borderline debilitated, hazardous driving prevention module 140 may issue a warning to the driver and/or passengers and/or may note that the driver drove under questionable conditions (for example on an internal memory and/or in a message over network) but may allow the driver to continue his trip. Combinations of the above actions may also be made.

In some embodiments, hazardous driving prevention module 140 may classify the potential driver according to driver's identity determined by driver identification module 120. For example, some drivers may be unauthorized to drive under any conditions. Some drivers may be authorized to drive only under certain conditions (for example in the presence of an authorized escort, in an emergency situation and/or when special permission is issued). Some drivers may be allowed to drive in certain areas and/or under certain conditions (at certain times, under good weather etc.). Some drivers may be permitted to drive under more general conditions. Some drivers may not be given the benefit of the doubt (for example if there is a question of whether the driver is fit to drive, he may be prevented from driving for example by locking the ignition and/or fuel pump of the vehicle). Some drivers may be given the benefit of the doubt (for example if there is a question of whether the driver is fit to drive, he may be free to drive and/or the system will not prevent him from driving). Some drivers may be given limited benefit of the doubt (for example if there is a question of whether the driver is fit to drive he may be discouraged from driving, e.g., by warning him and/or by recording his condition and/or by sending a message to a third party, but will not be prevented from driving). For some conditions, even a preferred user may be prevented from driving (e.g., if one and/or multiple sensors indicate a high level of debilitation and/or debilitation at a high level of reliability and/or an illegal condition for example an illegally high blood alcohol). Combinations of the above actions may also be made. For example a certain driver may be given the benefit of the doubt in certain places and/or times and not in others and/or for certain senor results and/or not others and/or some users may be required to take more tests than others and/or take tests more often than others.

According to various embodiments, hazardous driving prevention module 140 may include one or more actuators 142 and/or one or more output devices 144. Actuator(s) 142 and/or output device(s) 144 may be in communication with hazardous driving prevention module 140 that may be configured to control actuator(s) 142 and/or output device(s) 144. For example, actuator(s) 142 may be in communication with vehicles systems (e.g., a vehicle processor) and may be used by hazardous driving prevention module 140 to prevent unauthorized use of the vehicle (either completely preventing use and/or limiting use for example by not allowing acceleration over a certain speed). In another example, output devices 144 may be used by hazardous driving prevention module 140 to warn a driver, a passenger and/or a third party of various hazardous conditions and/or behaviors.

According to some embodiments, system 100 may include a user interface 150. Hazardous driving prevention module 140 may be connected to a user interface 150 to, for example, allow a user (for example a supervisor of the fleet of vehicles and/or a parent and/or a vehicle owner) to adjust system 100 by, for example, changing how a driver is characterized by driver identification module 120 and/or by driver condition determination module 130 (e.g., based on readings of sensor(s) 110).

According to some embodiments, system 100 may include a storage module 160 (e.g., a computer readable memory). Storage module 160 may be in communication with driver identification module 120, driver condition determination module 130 and hazardous driving prevention module 140.

In some embodiments, storage module 160 may store readings from sensor(s) 110 (e.g., sensor(s) outputs). In some embodiments, storage module 160 may store data concerning identities of users of system 100 (e.g., fingerprints and/or facial data on authorized drivers).

In some embodiments, storage module 160 may include policies. The policies may, for example, include thresholds for sensor levels under which a driver will be allowed to drive, will be limited, will be warned etc. In some embodiments, the policies may be updated. For example, a supervisor may be able to change policies permanently and/or temporarily (for example if an authorized driver tests as debilitated, a non-authorized driver may be given temporary approval to drive (for example to return the authorized driver home)). Temporary approval may be conditioned (for example permission may only be for one trip to the home of the authorized driver). For example, some supervisors may keep strict policies and avoid dangerous conditions (for example alcohol levels) even when they are borderline and/or within the legal limits. In another example, some supervisors may keep policies that are less strict without interfering except in cases where there is a high probability of illegal behavior (e.g. driving over the legal alcohol limits).

In some embodiments, storage module 160 may store trip information. The trip information may, for example, include speed, location, time etc.

In various embodiments, storage module 160 may store a log with details of trips and/or drivers. For example, the log may include vehicle identification, the times and/or locations of the vehicle, speeds, driver identities, and driver states (for example sensor outputs). For example, the log may be used by insurance to decide risk and/or rates. For example, the log may be used to derive driving statistics and/or improve policies to reduce accidents. In some embodiments, the log may be collected by legal agencies, especially for example in the case of public vehicles (e.g., buses) and/or commercial vehicles (e.g., trucks and/or cabs) and/or vehicles carrying hazardous cargos. For example, the log may be used in case of an accident to determine indemnity. For example, the log may be stored on a local memory and/or a remote memory.

In various embodiments, at least some data/information stored in storage module 160 may be protected. For example, a driver may not have the access to change the contents of the memory.

According to some embodiments, hazardous driving prevention module 140 may be in communication with an external network 80. Hazardous driving prevention module 140 may receive data/information from an external network (e.g., road information, geolocation data, etc.).

According to various embodiments, hazardous driving prevention module 140 may use a sensor and/or network connection of a driver's cell phone and/or a processor and/or a battery and/or a memory of the driver's cell phone. For example, the cell phone may include an application that coordinates connection to system 100.

According to some embodiments, hazardous driving prevention module 140 may include a dedicated wireless transceiver for example to a cellular network. hazardous driving prevention module 140 may connect to a network via an external device. For example, hazardous driving prevention module 140 may use a personal computing device (e.g., a cellphone for external communications). For example, an authorized driver may be required to connect the driver's cell phone to the system before and/or during driving. For example, system 100 may include a hard-wired cell-phone dock. Hazardous driving prevention module 140 may connect to a cell phone via a wireless connection (e.g., Bluetooth). In another example, an additional optional safety feature of system 100 may include that the cell phone of the driver may be required to be docked and/or the screen off and/or not sensitive to touch while the user is driving. For example, the system may use various consequences (e.g., preventing driving, notifying a third party, warning buzzers, etc.) unless the cell phone is docked and/or reports that its screen is off. In some embodiments, the at least some modules of system 100 may receive software updates and/or user support over a network connection.

According to some embodiments hazardous driving prevention module 140 may send information, receive information, send requests for action and/or receive instruction from a third party. For example, a third party may include a vehicle owner and/or supervisor. For example, in the case of a company vehicle and/or a rented vehicle, the supervisor may include the vehicle owner. For example, in the case of a family vehicle the third party may include the head of the household, a parent and/or a spouse. In some embodiments, the third party may include an authority, for example the police and/or an emergency responder. Optionally, the third party may include an insurer. For example, the insurance company may agree to lower insurance costs for clients who agree to installation of the system and/or that the insurance company receives the data. For example, the information sent to a third party may include the times and locations of the vehicle, speeds, driver identities, driver states (for example sensor outputs and/or debility levels).

According to some embodiments, hazardous driving prevention module 140 may be connected to driver information systems of a vehicle. For example, when a driver appears to be debilitated, warning lights of the vehicle and/or a sound system of the vehicle may be used to tell the driver and/or the passengers that driving now is not recommended. For example, a seat belt warning light and/or buzzer and/or the like may be used to discourage driving under the influence of drugs and/or alcohol.

According to some embodiments, hazardous driving prevention module 140 may present to a user options to avoid driving. For example, the options may be presented orally (over the speakers of the vehicle and/or over a cellphone) and/or as a message (e.g., a message sent over a cell network messenger service (e.g., SMS, Whatsapp, etc.) and/or as a notification (presented for example on a screen of the vehicle and/or a PCD). For example, alternative transportation sources may include options for commercial transport e.g. a recommendation for taxis and buses relevant to the location and time desired. In some embodiments, hazardous driving prevention module 140 may post the location on a network with a request for transportation and/or help from other nearby drivers. For example, the network may include a closed network, for example members of the driver's associates and/or people associated with the vehicle owner. In some embodiments, the request may be sent over a public network for example, a ride sharing network and/or a traffic safety network arranging rides for stranded and/or debilitated drivers. In some embodiments, hazardous driving prevention module 140 may call for help from a public or private service, for example a towing service, police, ambulance, etc.

According to some embodiments, hazardous driving prevention module 140 may ensure that the driver who is driving a vehicle is really the driver that was approved at the beginning of a trip. For example, after approving a user to drive, the hazardous driving prevention module 140 may require the user to confirm his identity using sensor(s) 110 (e.g., using first sensor 112) and driver identification module 120. For example, during a trip and/or after a trip hazardous driving prevention module 140 may require that an authorized driver confirm his identity. If the authorized driver is not in the vicinity of the vehicle and/or does not identify himself to a local sensor, the system may take action.

In some embodiments, when an approved driver fails to identify himself during a trip, hazardous driving prevention module 140 may give a warning and/or may give a limited time to park the vehicle and turn it off. In some embodiments, hazardous driving prevention module 140 may prevent the user from stowing the vehicle (for example by preventing him from turning the vehicle off and/or from turning off the emergency blinkers) until the approved driver identifies himself and/or the system may inform a third party when an approved driver failed to reidentify himself before a vehicle was turned off. In some embodiments, certain functions of the vehicle may require reidentification of the approved driver. For example, when an approved driver is not present and/or was not present when the vehicle is turned off, a gas cap may be locked, preventing refueling until corrective action is taken. In some embodiments, if a vehicle was turned off without the approved driver reidentifying himself, the approved driver may be prevented from using the vehicle again and/or may be prevented from using any vehicle in a fleet until corrective action is taken. In some embodiments, if a vehicle was turned off without the approved driver reidentifying himself, the vehicle may be locked to prevent one or more drivers from using the vehicle until corrective action is taken. For example, requirements for the driver to identify himself may be set at time when it is not dangerous for the driver reidentify himself, for example while the vehicle is stopped.

In various embodiments, hazardous driving prevention module 140 may require the driver to identify himself by means of a password and/or by means of first sensor(s) 112. For example, first sensor(s) 112 may include a fingerprint detector and/or by face recognition and/or voice recognition. First sensor(s) 112 may be on an external device and/or hazardous driving prevention module 140 may wait for confirmation over a local network (e.g. Bluetooth from the driver's cell phone) that he has identified himself. In some embodiments, first sensor(s) 112 may be mounted in the vehicle. In some embodiments, other sensors may be used to identify a driver and/or discern a change in his behavior that may imply debilitation. For example, hazardous driving prevention module 140 may receive data from and/or be attached to vehicle sensors (for example a speedometer and/or an accelerometer of an airbag) and/or an external sensor such as a driver's assistance sensor (e.g., MobileEye) and/or a cell phone sensor (e.g., a fingerprint reader, a camera and/or facial recognition software, an IR detector, a microphone and/or voice recognition software etc.). In some embodiments, any of the above-mentioned sensors may be a dedicated sensor mounted in the vehicle or mounted on another device.

According to some embodiments, hazardous driving prevention module 140 may monitor the behavior of the driver and/or the vehicle and use the data to discern changes that may imply that the driver is not the person who was approved and/or that the driver is debilitated. Optionally, hazardous driving prevention module 140 may use artificial intelligence to interpret data. In this manner, requiring the driver to reidentify himself may discourage a non-approved user to drive based on approval for another driver. Optionally, the data will be used to determine other factors for example about vehicle performance.

According to some embodiments, system 100 may include a self-test module 170. In some embodiments, a user may be enable to use at least some of modules of system 100 "off the record". For example, a user may test himself, for example to determine his alcohol level. Self-test module 170 may be configured to use sensor(s) 110 and/or hazardous driving prevention module 140 without reporting to a third party and/or storing results in storage module 160. Optionally self-test module 170 may give useful information such as "how much more can I drink before going over the permissible alcohol level", "how long must I wait until my blood alcohol will return to an acceptable level", etc. In some embodiments, self-test module 170 may allow a user to make such a determination (possible with low accuracy or reliability) with a cell phone sensor (for example an infrared detector). In some embodiments, the user will use a sensor mounted to a car for off the record measurements. In some embodiments, sensor(s) 110 of system 100 may be portable. For example, a blood level sensor and/or wireless data transmitter may be mounted on a vehicle key. For example, the user may be able to take the key with him and receive results on his cell phone results of blood alcohol tests for himself and/or his associates. Optionally, self-test module 180 will require that the key and/or sensor be close to the car when a potential driver is identified and/or tested for debilitation.

According to some embodiments, system 100 may include a power source 180. In some embodiments, power source 180 may be connected to sensor(s) 110, driver identification module 120, driver condition determination module 130, hazardous driving prevention module 140, user interface 150, storage module 160 and self-testing module 170 and adapted to provide power thereto. In other embodiments, at least some modules of system 100 may receive power from the battery of the vehicle and/or have a dedicated battery.

According to various embodiments, each of modules of system 100 (e.g., driver identification module 120, driver condition determination module 130, hazardous driving prevention module 140, storage module 160, self-testing module 170) may be implemented on its own computing device, a single (e.g., shared) computing device, a personal computing device (e.g., cell phone) of the driver, a cloud, or a combination of computing devices.

According to some embodiments, system 100 may be retrofitted to be used with existing vehicles. The flexible rules of system 100 may make it suitable for use with a range of simple sensors and/or available sensors. For example, the flexible decision-making process may make it possible to achieve an effective system with sensors that are not themselves highly reliable. Optionally this facilitates fitting system 100 into existing and/or low value vehicles without expensive installation and/or expensive high accuracy sensors. For example, checking the driver at various stages and/or at the end of a trip may make it possible to avoid drivers fooling the system (one person passing a test and then letting another drive) without requiring expensive and/or obtrusive sensors that are hard installed to the car and identify the driver during a trip.

Figure 2:
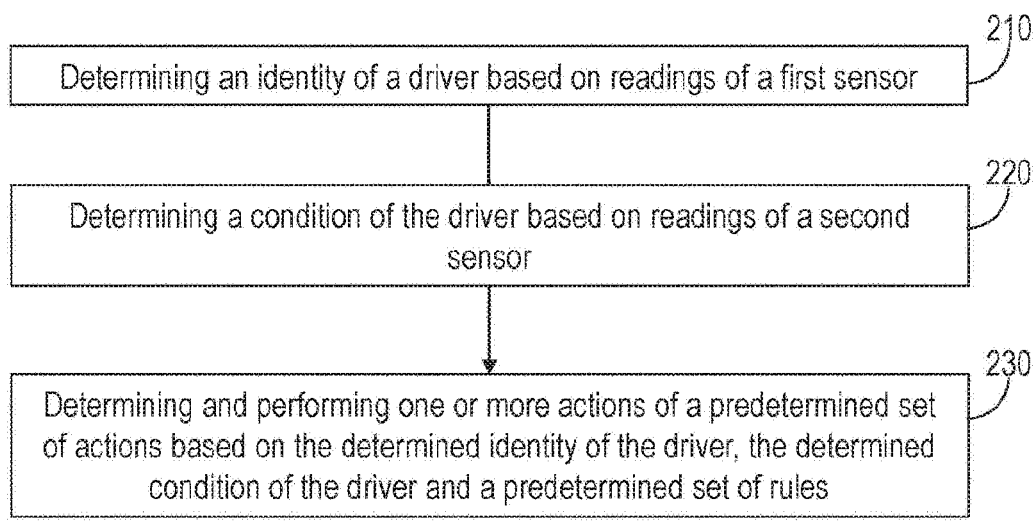
FIG. 2 is a flowchart of a method of preventing an unauthorized and/or hazardous use of a vehicle, according to some embodiments of the invention.

Reference is now made to FIG. 2, which is a flowchart of a method 200 of preventing an unauthorized and/or hazardous use of a vehicle, according to some embodiments of the invention.

Method 200 may be implemented by system 100, which may be configured to implement method 200. It is noted that method 200 is not limited to the flowchart illustrated in FIG. 2 and to the corresponding description. For example, in various embodiments, method 200 needs not move through each illustrated box or stage, or in exactly the same order as illustrated and described.

According to some embodiments, method 200 may include determining an identity of a driver based on readings of a first sensor (stage 210). For example, the first sensor may be similar to first sensor(s) 112 described above with respect to FIG. 1. The identity of the driver may be determined using, for example, driver identity determination module 120 as described above with respect to FIG. 1.

According to some embodiments, method 200 may include determining a condition of the driver based on readings of a second sensor (stage 220). For example, the second sensor may be similar to second sensor(s) 114 described above with respect to FIG. 1. The condition of the driver may be determined using, for example, driver condition determination module 130 as described above with respect to FIG. 1.

According to some embodiments, method 200 may be determining and performing one or more actions of a predetermined set of actions based on the determined identity of the driver, the determined condition of the driver and a predetermined set of rules (stage 230). For example, the determining and performing of the one or more actions may be utilized using hazardous driving prevention module 140 as described above with respect to FIG. 1.

In some embodiments, the predetermined set of actions may include at least one of: allowing the driver to use the vehicle, allowing the driver to use the vehicle under certain restrictions, and warning at least one of the driver, passengers and a third party concerning the determined condition of the driver (e.g., as described above with respect to FIG. 1).

In some embodiments, method 200 may include classifying the driver based on the determined identity of the driver to yield a classification of the driver; and determining and perform the one or more actions based on the determined condition of the driver and further based on the classification of the driver (e.g., by hazardous driving prevention module 140 as described above with respect to FIG. 1).

In some embodiments, method 200 may include reidentifying the driver to ensure that the driver who is driving a vehicle is the driver that is allowed to drive (e.g., by hazardous driving prevention module 140, driver identity determination module 120 and using first sensor(s) 112 as described above with respect to FIG. 1).

In some embodiments, method 200 may include enabling the driver to perform a self-test without saving a self-test result in a log of the system (e.g., using self-test module 180 as described above with respect to FIG. 1).

Advantageously, the disclosed system and method may provide an objective and real-time determination of a driver's condition by measuring various physiological parameters of the driver (e.g., alcohol levels, drugs levels, hormones, etc.) and an objective real-time determination whether the driver is capable to safely operate the vehicle.

The disclosed system and method may be also implemented in various additional fields, such as medicine (e.g., to determine the physician's condition), construction industry, legal industry, etc. Optionally, the system and method may be implemented in emergency departments in hospitals to, for example, determine a patient's condition, etc.

Some embodiments include a system for limiting or preventing access. A system for limiting or preventing access, according to some embodiments of the invention, may be used in contexts other than driving. For example, a system for limiting or preventing access may be used to grant, limit, or prevent access to an apparatus and/or building.

An embodiment may prevent an unfit user (e.g. a user under the influence of drugs and/or alcohol, or a user in an unfit emotional state such as high stress) from operating other classes of vehicle from those mentioned above. For example, a system according to embodiments of the invention may prevent or limit an unfit user from operating, for example: an aircraft (such as an airplane, helicopter, unmanned aerial vehicle "UAV" e.g. drone, or the like), a water-based craft (such as a boat, a ship, a jet-ski, a submersible, or the like), an amphibious craft, a hovercraft, a rail vehicle (such as a train, tram, monorail, maglev, or the like), and/or a spacecraft.

A system according to embodiments of the invention may prevent or limit a user, such as an unfit user, from operating heavy machinery such as (but not limited to): a scissor lift, a forklift, a bulldozer, a crane (such as a tower crane, mobile crane, crawler, or the like), an excavator, a wheel loader, a compactor, a concrete mixer, a tunnel boring machine, a shredder, logging equipment (such as skidders, feller bunchers, delimbers, or the like). Other types of machinery generally considered heavy machinery and not listed in the examples herein may also have their operation limited or prevented by embodiments of the invention.

A system according to embodiments of the invention may prevent or limit a user, such as an unfit user, from operating a power tool such as (but not limited to): a chainsaw, electric drill, buzzsaw, a nail gun, a belt sander, or the like.

A system according to embodiments of the invention may prevent or limit a user, such as an unfit user, from operating a medical device, such as (but not limited to): a Magnetic Resonance Imaging (MRI) scanner, a Computed Tomography (CT) scanner (also known as CAT scanner), a Positron Emission Tomography (PET) scanner, an X-ray machine, an electrocardiogram (ECG) machine, an electroencephalogram (EEG) Machine, or the like.

A system according to embodiments of the invention may prevent or limit a user, such as an unfit user, from accessing a building such as, (but not limited to): an airport, a stadium (e.g. a sports stadium, a concert hall, or the like), a factory, a school (e.g. a high school, a college, a university, or the like). A system according to embodiments of the invention may prevent or limit a user, such as an unfit user, from accessing other environments such as (but not limited to): a mine, a quarry, a building site, an operating theatre (e.g. a place for performing surgery), or the like.

Figure 3:
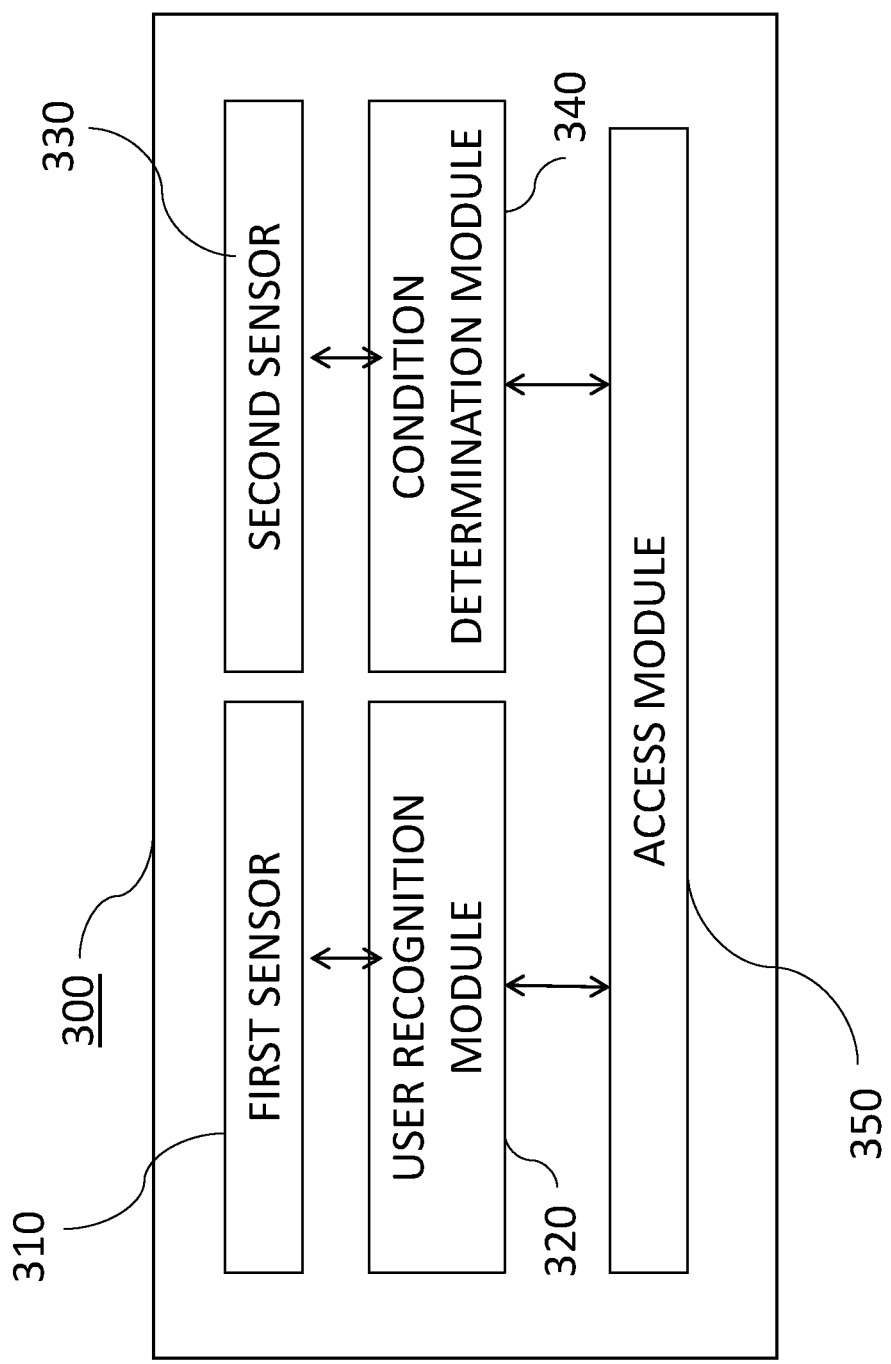
FIG. 3 is a schematic diagram of a system for limiting or preventing access, according to some embodiments of the invention.

FIG. 3 shows a block diagram of a system 300 for limiting or preventing access. System 300 may include a first sensor 310. First sensor 310 may be a sensor configured for at least one of facial recognition, voice recognition, and/or fingerprint recognition. For example, first sensor 310 may be an imaging sensor such as a camera, configured to image a user's face or fingerprint. In some embodiments, first sensor 310 may be an audio sensor such as a microphone, configured to record a voice or spoken phrase of a user.

System 300 may also include a user recognition module 320. User recognition module may be a hardware element such as an integrated circuit (IC), chip or computer processor. In some embodiments, user recognition module 320 may be a processor (e.g. processor 805 in FIG. 8) executing a software element such as a piece of code, or script. User recognition module 320 may be in communication with first sensor 310. User recognition module 320 may be configured to determine an identity of a user based on one or more readings of first sensor 310. For example, user recognition module 320 may be configured to remotely access a database of user identifying information (e.g. a database of faces, fingerprints, and/or voiceprints) and retrieve an identity of a user based on a match in the database with one or more readings of first sensor 310.

System 300 may also include a second sensor 330. Second sensor 330 may be integrated with first sensor 310 or may be independent. Second sensor 330 may be configured to obtain one or more spectral measurements at one or more specified wavelengths. For example, second sensor 330 may emit one or more incident wavelengths of electromagnetic radiation onto a sample area of the user (such as a wrist, fingertip, or the like) and may measure a reflected signal.

System 300 may include a condition determination module 340. Condition determination module 340 may be in communication with second sensor 330. Condition determination module 340 may be configured to determine a condition of the user based on one or more readings of second sensor 330. For example, condition determination module 340 may be configured to determine at least one of: a hormone level; an alcohol level; a legal drug level; and/or an illegal drug level of the user based on one or more spectral measurements made by second sensor 330. For example, condition determination module 340 may determine if a user is above the legal limit for blood alcohol level.

Embodiments of the invention may use one or more specified or configured wavelengths for detecting particular chemicals. For example, for detecting ethanol (e.g. alcohol) embodiments of the invention may use or detect electromagnetic radiation specified as or having wavelengths from 1250 nm to 1500 nm, and/or from 2000 nm to 2500 nm. If electromagnetic radiation within the specified wavelength range exists, or exists above or below a threshold, action such as preventing user access may be taken. For example, a test subject may have a finger illuminated with the specified wavelengths, and the return signal may be measured and a difference in expected signal (e.g. different compared to a baseline such as water or blood) may be measured: a difference in expected signal may indicate the presence of alcohol in the blood.

FIGS. 4A-4D show example spectral measurements according to some embodiments of the invention. In FIGS. 4A-4D, the x-axis shows wavelength of light in nanometers (nm), and the y-axis shows relative absorbance.

Figure 4A:
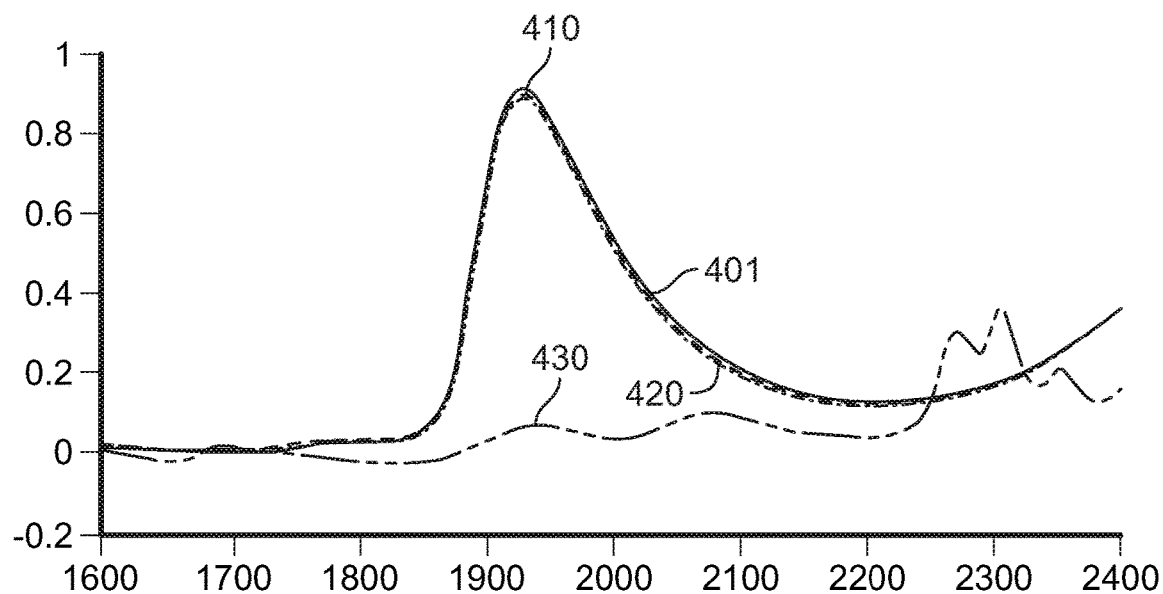
FIGS. 4A-4D show example spectral measurements according to some embodiments of the invention.

FIG. 4A shows a 100% water solution (Line 420), a 95% ethanol solution (Line 430), a solution of 200 drops of water mixed with 1 drop of 95% ethanol (Line 410) and a solution of 200 drops of water mixed with 2 drops of 95% ethanol (Line 401). As can be seen, there are slight differences in the spectral signature of the 200 drops of water mixed with 1 drop of 95% ethanol, the 200 drops of water mixed with 2 drops of 95% ethanol, and the 100% water.

Figure 4B:
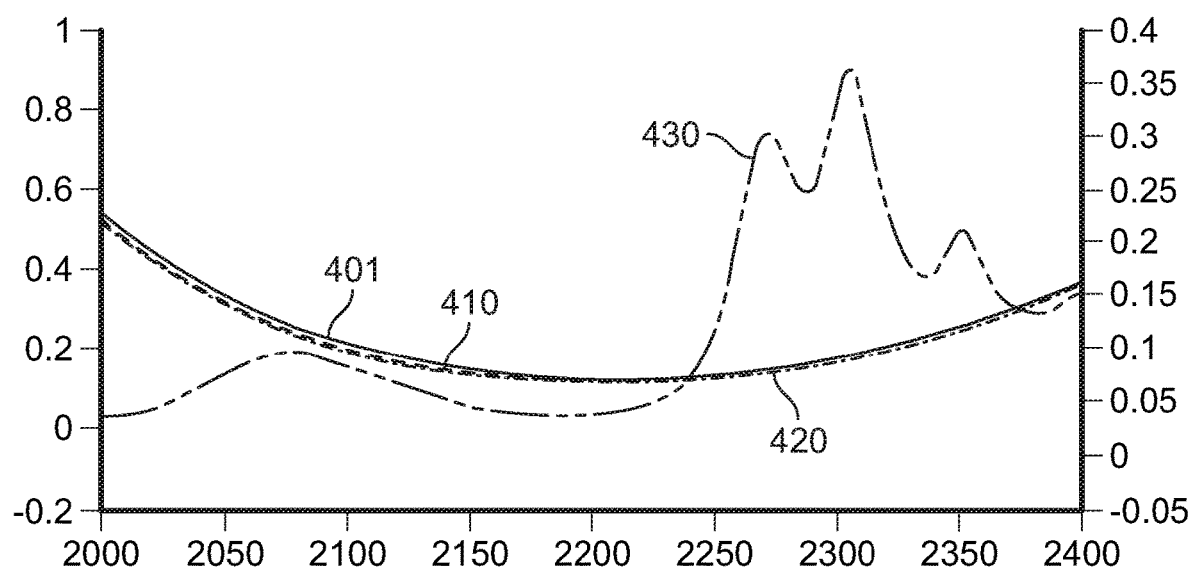

These differences are shown focused in FIG. 4B, where an adjusted scale for 95% ethanol solution (Line 430) is used, displayed on the right-hand side of the graph.

Embodiments of the invention may determine an alcohol level based on integral methods which in effect compare the area under the relevant measurement line to the area under the water line (e.g. the water line 420 acts as a control).

Figure 4C:
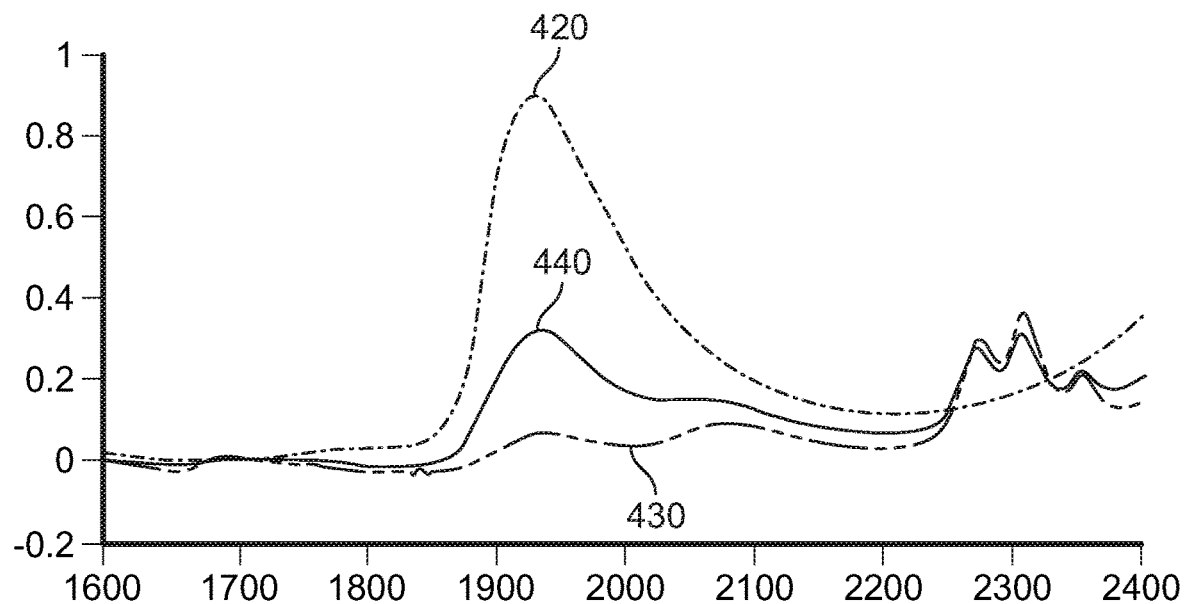
Figure 4D:
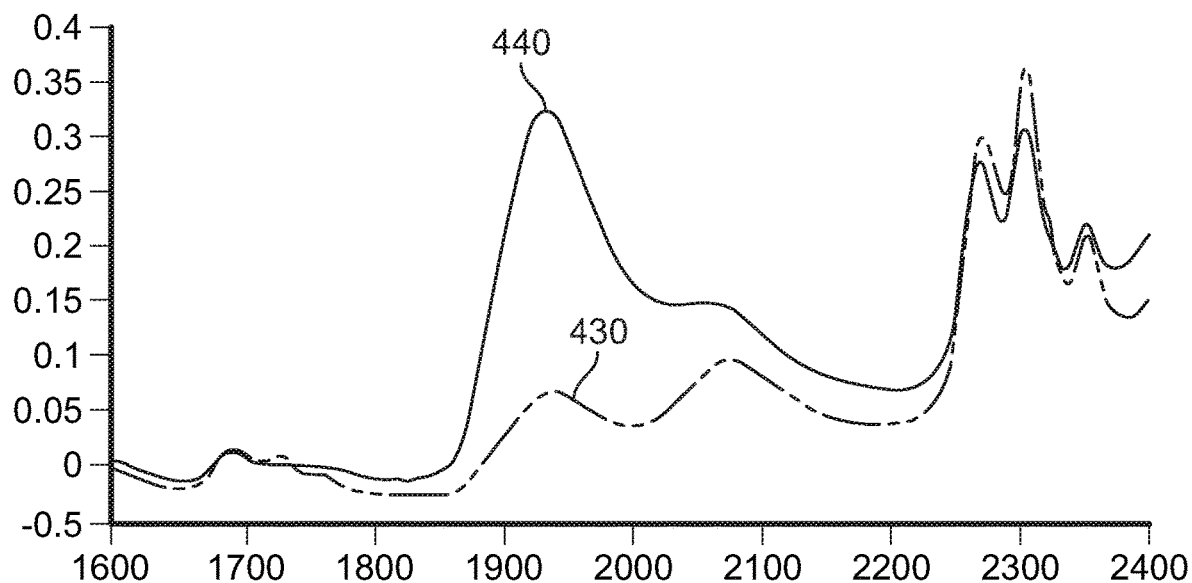

FIG. 4C shows a 100% water solution (Line 420), a 75% ethanol solution (Line 440) and a 95% ethanol solution (Line 430). FIG. 4D shows a focused view of FIG. 4C. As can be seen, ethanol (e.g. alcohol) has a different spectral signature to that of water, and differs with percentage concentration. Embodiments of the invention may detect such spectral signatures (e.g. by second sensor 330) and may determine an alcohol level based on the one or more detected spectral readings (e.g. using condition determination module 340).

Figure 5:
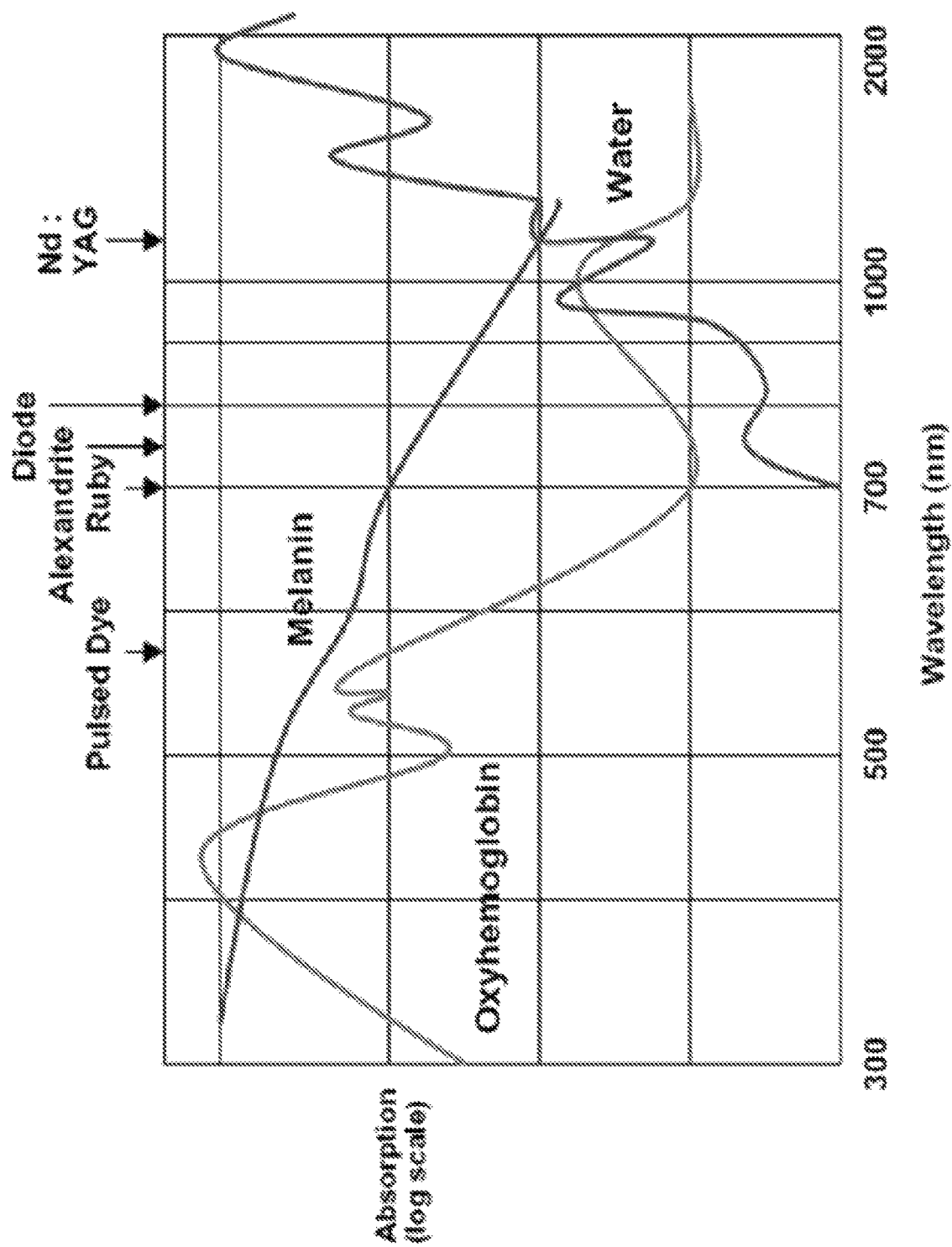
FIG. 5 shows how skin pigment (melanin) and oxygenated blood (oxyhemoglobin) may affect spectral measurements.

FIG. 5 shows how skin pigment (melanin) and oxygenated blood (oxyhemoglobin) may affect spectral measurements. Second sensor 330 may be configured or calibrated to remove an influence of melanin and/or oxyhemoglobin on the one or more spectral readings.

Figure 6:
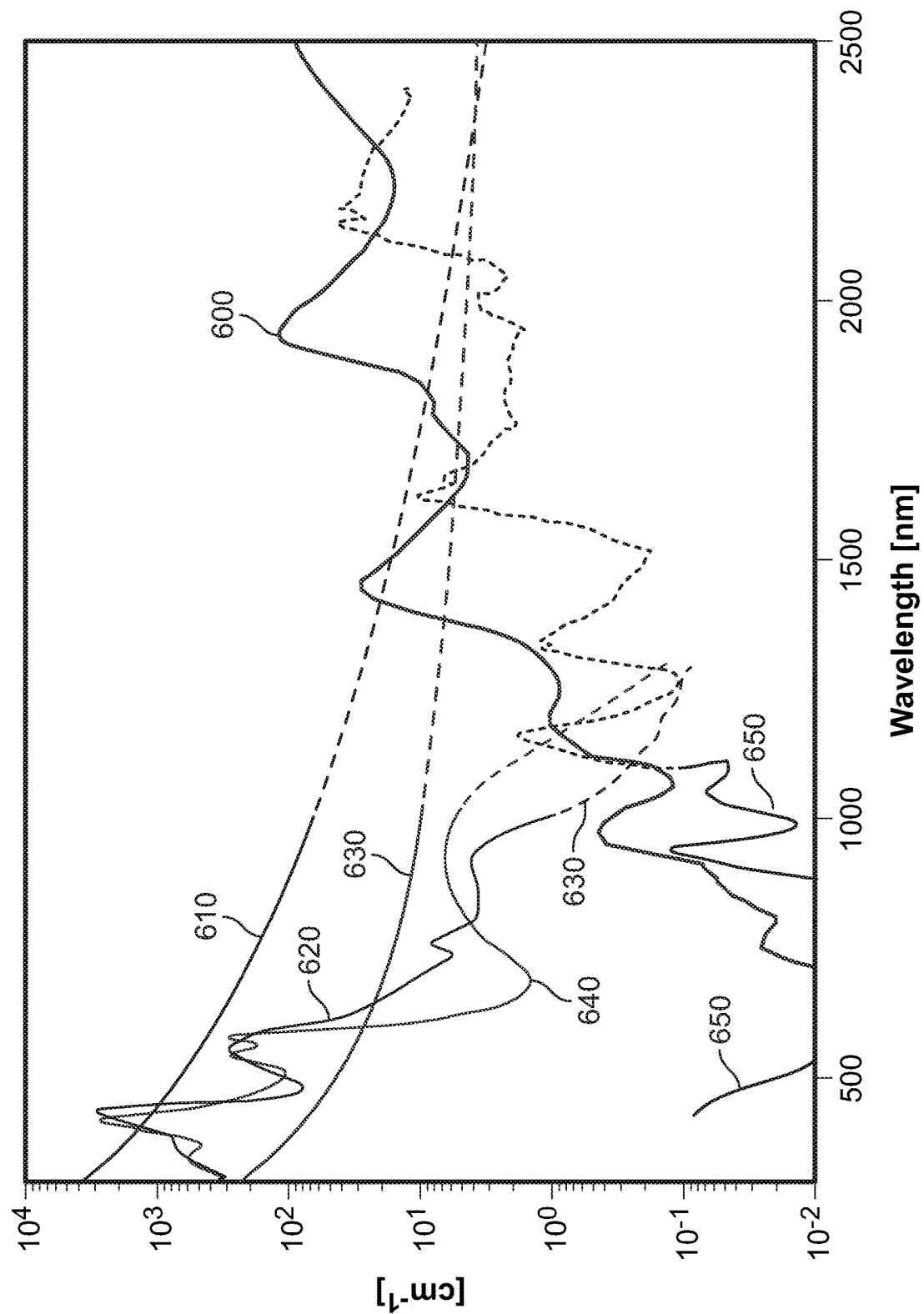
FIG. 6 shows how certain features may affect spectral measurements.

FIG. 6 shows how certain features may affect spectral measurements. For example, melanosome (610), deoxy blood (620), skin (630), oxy blood (640), and fat (650), compared to water (600). Second sensor 330 may be configured or calibrated to remove an influence of such features on the one or more spectral readings.

Condition determination module 340 may be configured to determine a level of: cannabis (marijuana), or opiates (such as heroin).

Condition determination module 340 may be configured to determine a level of hormones such as: cortisol, melatonin, and/or adrenaline. Some hormones (such as cortisol) may be indicative of stress in a user, and it may be desired that users under stress are prevented (or limited) from operating certain types of apparatus (such as vehicles, heavy machinery, medical devices, power tools, or the like) or from entering certain buildings (such as schools, an operating room, an airport, a stadium, a factory, or the like).

System 300 may include an access module 350. Access module 350 may be in communication with user recognition module 320 and/or condition determination module 340. Access module 350 may be configured to grant, limit, or prevent access of the user to at least one of an apparatus and/or a building (or other environment such as a specific room within a building e.g. an operating theatre within a hospital, or an environment such as a mine or construction site). Access module 350 may be configured to grant, limit, or prevent access based on at least one of: the determined identity of the user; the determined condition of the user; and/or a predetermined set of rules.

For example, certain users may be prevented access based on their identity: an identity of a user may be determined and whether that user appears on an approved list (such as maintained in a database on a remote server, such as a cloud server, in communication with access module 350), such as if the user is a doctor registered at Hospital A, the user will be granted access to a surgery room in Hospital A, whereas a user who is a receptionist registered at Hospital A will not be granted access (e.g. will be prevented from accessing) a surgery room at Hospital A. However, a registered doctor at Hospital A who is determined to have a high level of hormones such as cortisol (e.g. indicative of stress) may be prevented from accessing the surgery room due to liability and patient safety concerns since the user may be unfit to perform the surgery whilst stressed.

Similarly, access module 350 may only allow users who are registered as forklift drivers at Company B to operate a forklift, preventing non-registered users from doing so. However, a registered forklift driver who is determined by condition determination module 340 to be under the influence of an illegal drug may be prevented from operating the forklift by access module 350.

In some embodiments, access module 350 is in communication with a start button of an apparatus and may be configured to prevent access to the apparatus by disabling operation of the start button. For example, access module 350 may be part of an electronic control board integrated within (e.g. by an original equipment manufacturer "OEM"), or mounted externally to, the apparatus, and may be configured to send a control signal to prevent operation (e.g. by disabling an "on" function) of the apparatus.

Some embodiments may allow limited user access to an apparatus or building (e.g. not fully prevent). For example, access module 350 may be in communication with one or more operational systems of the apparatus and may be configured to limit access to the apparatus by limiting a maximum extent of one or more operational modes of the apparatus, or restricting operation to only a predefined set of the one or more operational modes of the apparatus. The operational system may include a telematics system, for example a telematics system of a vehicle.

As an apparatus-related example, a chainsaw may have one or more different speeds such as Fast, Medium, and Slow (in addition to a Zero speed when turned off). A predetermined set of rules may dictate that users with a blood alcohol level of 0.0% can access all of the speeds, users with a blood alcohol level of 0.05% can only access the Medium and Slow speeds (e.g. limiting a full extent of the available speeds), and users with a blood alcohol level of 0.08% (e.g. the legally intoxicated threshold) are prevented from operating the chainsaw entirely: for example the access module is in communication with a start button of the chainsaw and is configured to prevent operation of the chainsaw by disabling operation of the start button (e.g. via control circuitry, electronic board, jamming signal etc.).

As another apparatus-related example, a predetermined set of rules may limit different operational modes of a scissor lift based on levels of a legal drug which may have a common side effect of vertigo. For example, a maximum extension height of the scissor lift may be limited if the user has a level of the vertigo-causing drug above a predefined threshold predefined in the predetermined set of rules.

As a building-related example, access module 350 may be in communication with and may control a controllable access point of a building and may be configured to prevent access to the building by preventing or disabling opening of the access point for the user (e.g. preventing a user from opening a door; preventing a movable barrier from moving, etc.). For example, a user who is determined (e.g. by condition determination module 340) to be above a predefined threshold of an illegal drug (in which the threshold may be predefined as a minimal value corresponding to a zero-tolerance policy) may be prevented from entering a factory due to health and safety concerns. A controllable access point may be (but is not limited to): a door, a lock, a latch, a lift (e.g. an elevator), a turnstile, a ticket barrier, or the like. A system for preventing access according to embodiments of the invention may be integrated with such a controllable access point at a time of installation, or may be retro-fitted after installation of the access point. As an example, the system may be embodied as a combined finger-based system, with a fingerprint scanner (e.g. first sensor 310) and a spectral measurement device (e.g. second sensor) configured to obtain spectral measurements of one or more wavelengths reflected from a blood stream in a tip of a user's finger. Such a system may be provided in places such as airports, where fingerprints may typically be taken. Embodiments of the invention may provide the additional benefit of determining a user's condition, such as whether a passenger is drunk or otherwise intoxicated before being allowed to board an airplane.

According to some embodiments of the invention, system 300 is configured to alert a third party as to the determined condition of the user. For example, system 300 may alert an employer, a manager, a police agency, a security agency, an insurer, or the like as to the determined condition of the user. System 300 may also send the determined identity of the user (e.g. as determined by user recognition module 320) to the third party alongside the determined condition of the user.

System 300 may alert a third party by way of, for example, an email notification, a short message service (SMS) message, a warning sound, alarm, buzzer, flashing light, or the like. System 300 may include one or more additional processors for other functions such as timestamping, network communication, or the like.

In some embodiments, system 300 may include a wearable element. For example, one or more elements of system 300 may be included as part of a smartwatch, patch, sticker, or the like.

For example, in some embodiments, the second sensor and the condition determination module are comprised (e.g. are included) in a wearable element. For example, a smartwatch worn close to the wrist of a user may take one or more readings (possibly continuous readings) which include one or more spectral measurements at one or more specified wavelengths. The condition determination module may be in communication with the second sensor and may determine a condition of the user based on the one or more readings of the second sensor. A stationary part of the system may include the first sensor, the user recognition module, and the access module, and may be in communication with the wearable element (for example via Bluetooth, Wi-Fi, or the like). For example, a user may initiate an attempt at access (e.g. to enter a building or operate an apparatus such as heavy machinery) at the stationary part of the system by having their identity determined by the first sensor and user recognition module. The access module may request data from the wearable element (e.g. from the condition determination module) in order to grant, limit, or prevent access of the user.

In some embodiments, the wearable element may also include the first sensor and the user recognition module: for example the wearable element may include the first sensor, the second sensor, the user recognition module, and the condition determination module. A stationary part of the system may include the access module, which may request data from the wearable element (e.g. from the condition determination module and/or user recognition module) in order to grant, limit, or prevent access of the user.

In some embodiments, user recognition module 320 may use one or more sensors and/or network connection of a user's cell phone and/or a processor and/or a battery and/or a memory of the user's cell phone. For example, first sensor 310 may be a fingerprint sensor of a user's cell phone, a camera of a user's cell phone, and/or a microphone of a user's cell phone. User recognition module 320 may be part of the user's cell phone. The cell phone may include an application or app that coordinates connection to system 300, for example an application which determines an identity of the user and communicates this to access module 350.

In some embodiments, a user's cell phone may include first sensor 310 and user recognition module 320, and a wearable element of the user (such as a smartwatch in communication with the user's cell phone) may include second sensor 330 and condition determination module 340. The cell phone and the wearable element may both be in communication with access module 350 (e.g. wireless communication such as Bluetooth, Wi-Fi etc.).

Alternatively, the wearable element may include second sensor 330 and the user's cell phone may include first sensor 310, user recognition module 320 and condition determination module 340, so as to have access to greater computational power from the processors of the cell phone as compared to any processors of the wearable element. The user's cell phone and the wearable element may be in communication with one another (e.g. so that second sensor 330 in the wearable element can communicate the one or more readings to condition determination module 340 in the cell phone), and the cell phone may be in communication with access module 350 (e.g. wireless communication such as Bluetooth, Wi-Fi etc.).

Aspects of the invention may also be embodied as a method. FIG. 7 shows a flowchart of a method 700 for limiting or preventing access according to some embodiments of the invention.

Method 700 may include determining, by a user recognition module (such as user recognition module 320 shown in FIG. 3), an identity of a user based on one or more readings of a first sensor (Step 710). The first sensor may be the same as first sensor 310 shown in FIG. 3, and may be configured for at least one of: facial recognition, voice recognition, and/or fingerprint recognition.

Method 700 may include determining, by a condition determination module (such as condition determination module 340 shown in FIG. 3), a condition of the user based on one or more readings of a second sensor (Step 720). The second sensor may be the same as second sensor 320 shown in FIG. 3. Determining a condition of the user may include determining at least one of: a hormone level; an alcohol level; a legal drug level; and/or an illegal drug level of the user based on one or more spectral measurements by the second sensor at one or more specified wavelengths.

Method 700 may include granting, limiting, or preventing access of the user, by an access module (such as access module 350 shown in FIG. 3) to at least one of: an apparatus or a building based on at least one of: the determined identity of the user; the determined condition of the user; and a predetermined set of rules (Step 730). The apparatus may be, but is not limited to, one of the apparatuses or vehicles disclosed herein, and the building may be, but is not limited to, one of the buildings or environments described herein.

In some embodiments, method 700 includes limiting a maximum extent of one or more operational modes of the apparatus, or restricting operation to only a predefined set of the one or more operational modes of the apparatus. For example, as discussed herein, a maximum height of a scissor lift may be limited (e.g. by the access module) if a user is determined to have an above threshold level of a legal drug which causes side-effects of vertigo.

In some embodiments, method 700 includes preventing access to a building by disabling opening of a controllable access point for the user. The disabling may be performed or may be caused by a control signal of the access module.

In some embodiments, method 700 includes alerting a third party as to the determined condition of the user. The nature of the alert and of the third party may be as described previously herein.

Embodiments of the invention may connect to a telematics system of an apparatus, such as a telematics system of a vehicle. Embodiments of the invention, potentially via the telematics system, may be in communication with a fleet manager system. Embodiments of the system may be in communication with a cloud management system of the apparatus and/or building (such as a building management system BMS).

Some embodiments of the invention may connect to a communications system within a building, or a site management system. For example, embodiments of the invention may send a communication over a building communication system (e.g. public address system) when a user is prevented from accessing a building or area within the building.

Figure 8:
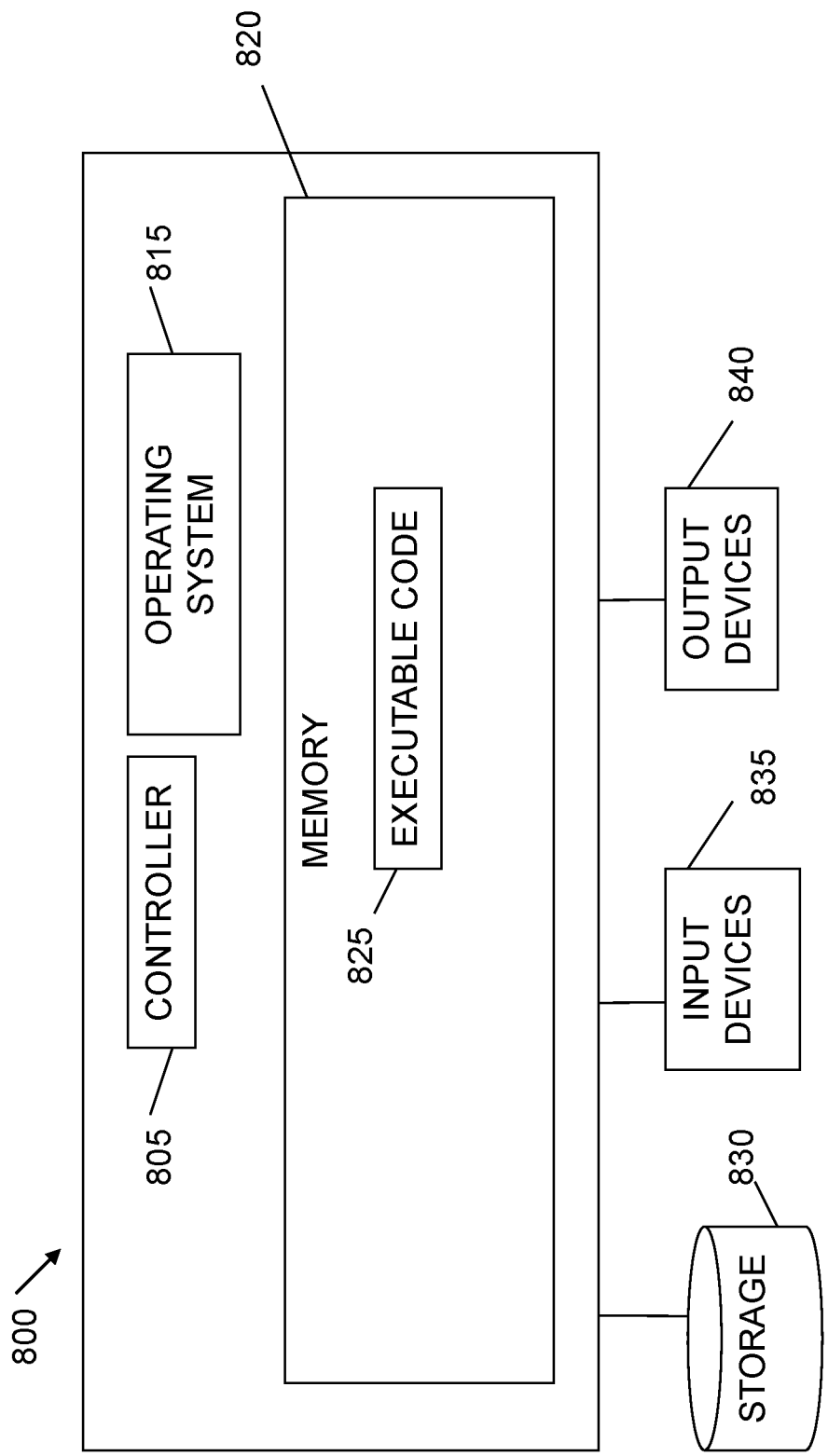
FIG. 8 is a block diagram of a computing device which may be used with embodiments of the invention.

FIG. 8 shows a block diagram of an exemplary computing device which may be used with embodiments of the present invention. Computing device 800 may include a controller or computer processor 805 that may be, for example, a central processing unit processor (CPU), a chip or any suitable computing device, an operating system 815, a memory 820, a storage 830, input devices 835 and output devices 840 such as a computer display or monitor displaying for example a computer desktop system.

As disclosed herein, any of user recognition module 320, condition determination module 340 and/or access module 350 may be embodied as processor such as processor 805.

Operating system 815 may be or may include code to perform tasks involving coordination, scheduling, arbitration, or managing operation of computing device 800, for example, scheduling execution of programs. Memory 820 may be or may include, for example, a Random Access Memory (RAM), a read only memory (ROM), a Flash memory, a volatile or non-volatile memory, or other suitable memory units or storage units. At least a portion of memory 820 may include data storage housed online on the cloud. Memory 820 may be or may include a plurality of different memory units. Memory 820 may store for example, instructions (e.g., code 825) to carry out a method as disclosed herein. Memory 820 may use a datastore, such as a database.

Executable code 825 may be any application, program, process, task, or script. Executable code 825 may be executed by controller 805 possibly under control of operating system 815. For example, executable code 825 may be, or may execute, one or more applications performing methods as disclosed herein, such as for preventing or limiting access of a user. As disclosed herein, method 700 may be performed by a computing device 800 or combination of computing devices 800. In some embodiments, more than one computing device 800 or components of device 800 may be used. One or more processor(s) 805 may be configured to carry out embodiments of the present invention by, for example, executing software or code.

Storage 830 may be or may include, for example, a hard disk drive, a floppy disk drive, a compact disk (CD) drive, a universal serial bus (USB) device or other suitable removable and/or fixed storage unit. Data described herein may be stored in a storage 830 and may be loaded from storage 830 into a memory 820 where it may be processed by controller 805. Storage 830 may include cloud storage. Storage 830 may include storing data in a database.

Input devices 835 may be or may include a mouse, a keyboard, a touch screen or pad or any suitable input device or combination of devices. The input devices may also include a fingerprint reader, a microphone (e.g. for voice recognition) and/or a camera (e.g. for facial recognition). Output devices 840 may include one or more displays, speakers and/or any other suitable output devices or combination of output devices. An output device may include an actuator for disabling or preventing operation of a lock, a latch, a door, a moveable barrier or the like. Any applicable input/output (I/O) devices may be connected to computing device 800, for example, a wired or wireless network interface card (NIC), a modem, printer, a universal serial bus (USB) device or external hard drive may be included in input devices 835 and/or output devices 840.

Embodiments of the invention may include one or more article(s) (e.g., memory 820 or storage 830) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

For example, in some embodiments, a system for preventing or limiting access may include one or more computing devices 800. The computing devices may include devices such as cell phones or wearable elements such as smartwatches and patches. Example embodiments may include:

A standalone, all in one system including a computing device 800 that may identify a user, measure a level of alcohol, drugs, hormones etc. and control access that may be installed on the after market;

A standalone, all in one system including a computing device 800 that may identify a user, measure a level of alcohol, drugs, hormones etc. and control access that may be integrated within an apparatus or building by an OEM;

A system which includes an external user identification device (such as a cell phone) that connects with a computing device 800 of the system, the computing device configured to measure a level of alcohol, drugs, hormones etc. and control access;

A standalone, all in one system integrated within a cell phone (e.g. the computing device is a cell phone) which is configured to identify a user, measure a level of alcohol, drugs, hormones etc. and control access (e.g. wirelessly via an application or app);

A standalone, all in one system integrated within a wearable element (e.g. the computing device is a smartwatch or body patch) which is configured to identify a user, measure a level of alcohol, drugs, hormones etc. and control access (e.g. wirelessly via an application or app);

A system which includes an external user identification device (such as a cell phone) that connects with a wearable element configured to measure a level of alcohol, drugs, hormones etc. Access may be controlled by one of the cell phone, wearable element, or a third computing device installed at the apparatus or building.

Accordingly, a system according to embodiments of the invention may include a computing device 800 and/or a cell phone and/or a wearable element.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for limiting or preventing access, the system comprising:
   a first sensor;
   a user recognition module in communication with the first sensor and configured to determine an identity of a user based on one or more readings of the first sensor;
   a second sensor;
   a condition determination module in communication with the second sensor and configured to determine a condition of the user based on one or more readings of the second sensor, wherein determining a condition of the user based on one or more readings of a second sensor comprises determining a hormone level; and
   an access module in communication with the user recognition module and the condition determination module, the access module configured to grant, limit, or prevent access of the user to at least one of: an apparatus or a building, the access module configured to grant, limit or prevent access based on:
   the determined identity of the user;
   the determined condition of the user;
   a docking status of a cell phone of the user; and
   a predetermined set of rules.

2. The system of claim 1, wherein the second sensor and the condition determination module are comprised in a wearable element.

3. The system of claim 2, wherein the wearable element further comprises the first sensor and the user recognition module.

4. The system of claim 1, wherein the first sensor is a sensor configured for at least one of: facial recognition, voice recognition, or fingerprint recognition.

5. The system of claim 1, wherein the one or more readings of the second sensor comprise one or more spectral measurements at one or more specified wavelengths.

6. The system of claim 5, wherein the condition determination module is configured to determine at least one of:
   an alcohol level;
   a legal drug level; or
   an illegal drug level of the user based on the one or more spectral measurements.

7. The system of claim 1, wherein the apparatus is at least one of: a vehicle, heavy machinery, a medical device, or a power tool.

8. The system of claim 1, wherein the access module is in communication with a start button of the apparatus and is configured to prevent access to the apparatus by disabling operation of the start button.

9. The system of claim 1, wherein the access module is in communication with one or more operational systems of the apparatus and is configured to limit access to the apparatus by limiting a maximum extent of one or more operational modes of the apparatus, or restricting operation to only a predefined set of the one or more operational modes of the apparatus.

10. The system of claim 1, wherein the building is one of: a factory, a school, a stadium, an airport, or an operating theatre.

11. The system of claim 1, wherein the access module is in communication with a controllable access point of the building and is configured to prevent access to the building by disabling opening of the access point for the user.

12. The system of claim 1, wherein the system is configured to alert a third party as to the determined condition of the user.

13. A method for limiting or preventing access, the method comprising the steps of:
- determining, by a user recognition module, an identity of a user based on one or more readings of a first sensor;
- determining, by a condition determination module, a condition of the user based on one or more readings of a second sensor, wherein determining a condition of the user based on one or more readings of a second sensor comprises determining a hormone level; and
- granting, limiting, or preventing access of the user, by an access module to at least one of: an apparatus or a building based on:
  - the determined identity of the user;
  - the determined condition of the user;
  - a docking status of a cell phone of the user; and
  - a predetermined set of rules.

14. The method of claim 13, wherein the one or more readings of the second sensor comprise one or more spectral measurements at one or more specified wavelengths.

15. The method of claim 14, wherein determining a condition of the user based on one or more readings of a second sensor comprises determining at least one of:
- an alcohol level;
- a legal drug level; or
- an illegal drug level of the user based on the one or more spectral measurements.

16. The method of claim 13, wherein the apparatus is at least one of: a vehicle, heavy machinery, a medical device, or a power tool.

17. The method of claim 13, comprising preventing access to the apparatus by disabling operation of a start button.

18. The method of claim 13, comprising limiting a maximum extent of one or more operational modes of the apparatus, or restricting operation to only a predefined set of the one or more operational modes of the apparatus.

19. The method of claim 13, comprising preventing access to the building by disabling opening of a controllable access point for the user.

20. The method of claim 13, comprising alerting a third party as to the determined condition of the user.

* * * * *